Aug. 6, 1968          R. B. CLARK          3,395,856
AIR COMPRESSOR OIL CONTROL SYSTEM
Filed Dec. 30, 1966
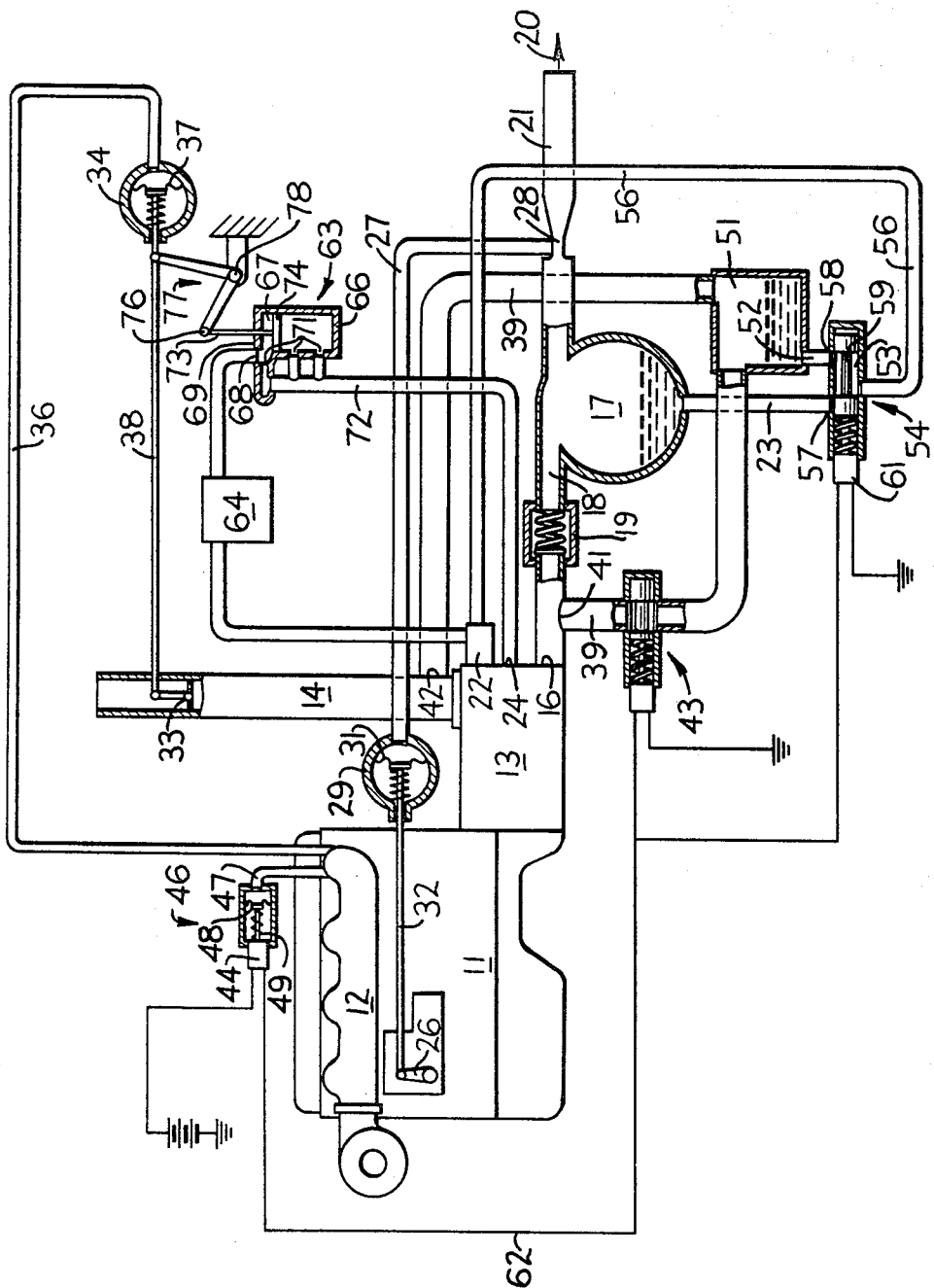
INVENTOR.
RICHARD B. CLARK
BY *Fryer, Tjensvold, Feix & Phillips*
ATTORNEYS 3,395,856
AIR COMPRESSOR OIL CONTROL SYSTEM
Richard B. Clark, Washington, Ill., assignor to Caterpillar
Tractor Co., Peoria, Ill., a corporation of California
Filed Dec. 30, 1966, Ser. No. 606,191
6 Claims. (Cl. 230—206)

ABSTRACT OF THE DISCLOSURE

To decrease compressor loading on the engine during operation at idling speed and thus increase the rapidity of engine response to external air demands, means selectively regulate the flow of lubricant into the internally lubricated compressor. Control means operate said lubricant flow regulator means in response to variations in compressor speed.

Cross-references to related applications

The present invention is particularly contemplated for, but not limited to, employment with air compressor systems as described in applicant's presently pending patent applications Ser. No. 592,665 for "Air Compressor System Employing Recirculating Means" and Ser. No. 582,-949 for "Air Compressor Control System Responsive to Air Flow."

Description of the prior art

The present invention relates to air compressor systems and more particularly to means for reducing the load on the prime mover during acceleration in response to air output demands.

Air compressor systems normally comprise a prime mover driving an air compressor and a receiver from which compressed air is supplied to air driven equipment. Turbocharged engines are commonly employed as the prime mover in industrial air compressor systems to provide increased power within a compact compressor system. A turbocharger is driven by the engine exhaust and in turn supplies intake air to the engine. When air is not being drawn from the receiver, it is desirable to permit the prime mover to operate at idling speed to conserve fuel and to minimize engine wear. When the system is called upon for output air, the engine must be rapidly accelerated to maintain the receiver air pressure at a satisfactory level to meet output demands. However, the reduced air supply to the engine, caused by the turbocharger operating at idling speed along with the engine, and the compressor load on the engine result in a "turbocharger lag" which limits rapidity of engine response to the compressor system load demands. To decrease the compressor load on the engine and thereby alleviate the above problem, prior art devices valve off the compressor air inlet during operation at idling speeds. Further, applicant in his copending patent application, Ser. No. 592,665, disclosed bypass means for permitting free circulation of compressor outlet air to the compressor inlet during operation at idling. Thus, the compressor load on the engine is decreased in that the compressor is not required to work against a constant pressure head.

By the apparatus of the present invention, a still further step is taken to reduce the compressor load on the engine during idling and during the critical acceleration period. During operation at compressing speeds, typical compressors commonly require a substantial internal flow of lubricant, e.g. to lubricate and seal the compressor vanes and to provide cooling. However, during operation at idling speeds, a much reduced flow of lubricant is adequate to protect the compressor. Maintaining a free supply of lubricant during operation at idling speed merely places an additional load on the compressor and thus on the engine driving the compressor.

Summary of the invention

The present invention reduces this compressor load on the prime mover by providing means for controlling lubricant flow into the compressor according to compressor speed. Thus, lubricant is provided to the compressor according to lubricant requirements therein and the compressor loading on the prime mover is reduced during operation at idling speeds and during the critical period of acceleration to compressing speed.

It is accordingly an object of the present invention to minimize the compressor load on the prime mover during idling and acceleration to compressing speed by providing means for regulating the flow of lubricant thereinto.

It is a further object of the invention to operate said lubricant flow regulation means in response to variations in compressor speed.

Brief description of the drawing

The drawing is a schematic illustration of an air compressor system including means for regulating the flow of lubricant into the compressor and means for operating said lubricant flow regulation means in response to prime mover speed variations.

Description of the preferred embodiment

Referring now to the drawing, an air compressor system comprises a prime mover 11 having an air inlet manifold 12 and connected by suitable gearing (not shown) to drive an air compressor 13. Compressor 13 has an air inlet 14 and a compressed air outlet port 16. A receiver 17 suitable for containing compressed air under high pressure is hermetically communicated with compressor outlet port 16 by pipe 18. A check valve 19 is preferably disposed across pipe 18 to prevent reverse flow of air from receiver 17 to compressor 13. Receiver outlet tube 21 hermetically connects receiver 17 with any suitable external air driven equipment (not shown). Generally, air flow 20 is selectively drawn from outlet 21 by controls on said air driven equipment. Compressor 13 is contemplated to be of a type requiring continuous internal lubrication upon the surfaces of the compressor elements (not shown). Oil provided to the interior of compressor 13 as a lubricant and coolant, is at least partly carried away in the compressed air exiting compressor 13. Receiver 17 is adapted to collect this lubricant from the compressed air therein. The collected lubricant is returned to a compressor lubricant pump 22, by gravity flow through receiver lubricant return line 23 and is continuously supplied to lubricant inlet 24 of compressor 13 by means of the pump 22. The arrangement and interconnection of the above-described compressor system components is contemplated as in accord with well known prior art practice.

To obtain maximum compressing power within a compact air compressor system, prime mover 11 is preferably a turbocharged engine wherein air is forced into engine inlet manifold 12 at a rate generally proportional to the speed of engine 11. To conserve fuel and minimize mechanical wear, engine 11 is preferably of a type which operates at idling speed when there is no external air demand and operates at compressing speed when an external air demand arises. Speed control means to regulate the speed of engine 11 in response to variations in external air demands may comprise a pressure sensor to detect pressure variations in receiver 17 and pressure actuated control means to operate engine speed regulating governor 26 in response to detected pressure variations in receiver 17. However, the speed of engine 11 is preferably regulated by apparatus disclosed in applicant's above-noted patent application, Ser. No 582,949. As taught therein, low pressure sidearm 27 communicates a venturi tube 28 disposed along receiver outlet 21 with a pressure-actuated control means 29. Flexible diaphragm 31, disposed across control means 29 as a hermetic closure to sidearm 27, flexes according to air flow variations in outlet 21 and resulting pressure changes in sidearm 27. Spring-loaded member 32 joins a flexible portion of diaphragm 31 and governor 26 such that governor 26 regulates engine 11 to idling speed when there is no air flow 20 in outlet 21. When air flows through outlet 21 in response to external air demands, governor 26 regulates engine 11 to compressing speed.

Also according to the above-noted patent application, a rotatable valve means 33 is disposed across compressor inlet 14 to be operated between open and closed relation thereto by pressure-actuated control 34. A conduit 36 communicates control 34 with the interior of manifold 12, while a flexible diaphragm 37 within control 34 is connected to a spring-loaded member 38 and a valve 33. Valve 33 operates according to pressure variations in manifold 12 in a manner similar to that described above for governor 26 and its associated pressure-actuated control 29. When engine 11 is idling, air pressure in manifold 12 and conduit 36 is low and control 37 operates valve 33 to a closed position. When engine 11 accelerates to compressing speed, air pressure in manifold 12 and conduit 36 rises and control 37 operates valve 33 to an open position admitting air into compressor inlet 14.

To reduce or eliminate the compressor loading caused by compressor 13 pumping against a constant pressure head in closed pipe 18 at idling speed, bypass means 39 is disposed around receiver 17 as taught in applicant's copending application, Ser. No. 592,665. One end 41 of bypass 39 is connected at compresor outlet 16, while a second end 42 communicates with compressor inlet 14 to permit free circulation of air from compressor outlet 16 to compressor inlet 14. To selectively permit such free air circulation only at idling speeds, an electrically activated solenoid valve 43 is disposed across end 41 of bypass conduit 39 and is operable in open and closed relation thereto. A switch 44 is a pressure-controlled switch operable between an "on" and an "off" position and connected with solenoid valve 43 such that, when switch 44 is "on," valve 43 closes off bypass conduit 39. When switch 44 is "off," valve 43 is in open relation to bypass conduit 39. To operate switch 44, pressure-actuated control 46 has a tube 47 communicating therefrom to the interior of engine inlet manifold 12. A flexible diaphragm 48 in control 46 provides a hermetic seal for tube 47 and is connected to switch 44 by spring-loaded member 49. The connection between these components is such that, when engine 11 is operating at compressing speed, there is high pressure in manifold 12 and tube 47 acts on diaphragm 48 and member 49 to move switch 44 into the "on" position, thus activating valve 43 and closing off bypass conduit 39. At idling speed, low pressure in manifold 12 and tube 47 permits spring-loaded member 49 to move switch 44 to the "off" position, thus deactivating valve 43 and opening bypass conduit 39.

To provide a continuous supply of recirculated lubricant to pump 22, according to the disclosure of the immediately above-noted patent application, oil collector means 51, e.g. a sump, is disposed in bypass 39 to collect entrained lubricant from compressed air therein. To prevent dissipation of receiver air pressure into bypass 39 during idling operation, receiver lubricant return line 23 and bypass lubricant return line 52, disposed to receive collected lubricant from bypass sump 51, separately communicate with an elongated chamber 53 defined by T-junction 54. Common lubricant return line 56 communicates chamber 53 with lubricant pump 22. With lines 23 and 52 communicating with opposite ends, respectively 57 and 58, of chamber 53, valve stem means 59 hermetically penetrates and is slidably disposed in T-junction chamber 53 to selectively permit lubricant flow from either lubricant return line 23 or bypass lubricant return line 52 into common return line 56. When lubricant from receiver lubricant return line 23 is permitted to flow into common line 56, sump return line 52 is sealed by valve means 59. Conversely, valve means 59 seals off receiver lubricant return line 23 while sump return line 52 is in lubricant flow communication with common return line 56. Electrically-actuated solenoid means 61 is electrically connected by conductor 62 to switch 44 and actuated thereby. When switch 44 is "on," valve means 59 is operated to permit lubricant flow between receiver lubricant return line 23 and common return line 56 to pump 22. When switch 44 is "off," valve means 59 is operated to permit lubricant flow from bypass sump lubricant return line 52 to common return line 56 and then to pump 22.

By the arrangement of components set out above, the quantity of lubricant recirculated to compressor 13 through pump 22 is somewhat reduced at idling speeds merely by the reduced speed of compressor 13 and the resultant decrease of entrained lubricant exiting compressor outlet 16. However, this possible reduction of recirculated lubricant flow is not necessarily related to minimum compressor lubrication requirements. In typical prior art compressor systems, the lubricant flow exceeds the minimum compressor requirements and serves only to increase the compressor loading on prime mover 11 during operation at idling speeds. To eliminate this unnecessary compressor loading, lubricant flow regulator means 63 is disposed between pump 22 and compressor 13 to selectively regulate the flow of lubricant internally provided to compressor 13 in response to variations in compressor 13 speed. Preferably, regulator means 63 is disposed between a lubricant cooling means 64 to which lubricant is delivered by pump 22, and compressor lubricant inlet 24.

Regulator means 63 is a valve having a housing 66 defining an elongated cylindrical chamber 67. A lubricant inlet 68 is defined at a first end 69 of chamber 67. Housing 66 also defines at least two but preferably a plurality of lubricant outlet ports 71 of selected generally equivalent sizes which are generally uniformly spaced and linearly aligned along the length of chamber 67. Ports 71 communicate with compressor lubricant inlet 24 by means of lubricant line 72. Elongated valve stem 73, having a substantially smaller diameter than chamber 67, hermetically and slidably penetrates end 69 of chamber housing 66. A cylindrical disc 74 is normally joined to end 75 of valve stem 73 penetrating into chamber 67. Disc 74 closely mates in slidable and sealing relation to housing 66 defining chamber 67. Thus, by moving valve stem 73 and disc 74 along the length of chamber 67, a varying number of lubricant outlet ports 71 are placed in communication with lubricant inlet port 68 by means of chamber 67 to control the flow of lubricant therethrough.

Lubricant flow regulator means 63 may have separate control means, responsive to speed variations of engine 11 or compressor 13. However, means 63 is preferably operated by compressor inlet pressure-actuated control 34. Spring-loaded member 38 of control 34 is joined to end 76 of valve stem 73 by pivotable lever 77 which is fixed at pivot point 78. Thus, when engine 11 is operating at compressing speed, increased air pressure in manifold 12 and line 36 acting against diaphragm 37 extends spring-loaded member 38 therefrom and rotates lever 77 in counterclockwise direction. Valve stem 73, connected to lever 77, accordingly moves disc 74 away from chamber end 69 and increases the number of outlet ports 71 in communication with inlet port 68. Conversely, when engine 11 and compressor 13 return to idling speed, air pressure in manifold 12, line 36 and acting against diaphragm 37 is reduced. Spring-loaded member 38 retracts toward control 34 and rotates lever 77 in clockwise motion. Valve stem 73 and disc 74 tend to be withdrawn from chamber 67 thus decreasing the number of outlet ports 71 in communication with inlet port 68.

In operation, when compressed air 20 is being withdrawn from outlet 21, engine 11 and compressor 13 are operating at compressing speed. Increased air pressure in manifold 12 acts against diaphragm 48 to activate switch 44. Accordingly, valve 43 is closed and T-junction valve means 59 permits lubricant flow only from receiver return line 23 into common return line 56 and pump 22. Increased air pressure in manifold 12 also acts against diaphragm 37 of control means 34 by line 36 to extend member 38 therefrom. Accordingly, compressor inlet valve 33 is opened. Now, when member 38 is extended, lever 77 is rotated counterclockwise, moving valve stem 73 and disc 74 thereon into chamber 67. Thus, an increased number of lubricant outlet ports 71 in communication with inlet 68 permits substantially free flow of lubricant from pump 22 and lubricant cooler means 64 into compressor 13.

When compressed air withdrawal from outlet 21 is terminated, engine 11 and accordingly compressor 13 are governed to idling speed, air pressure in manifold 12, line 47 and line 36 is reduced, switch 44 is operated to "off," and solenoid valves 43 and 61 are deactivated. Thus, bypass 39 is place in communication with compressor outlet 16 and valve means 59 is operated to permit lubricant flow from bypass sump 51 through line 52, T-junction chamber 53 and common return line 56 to lubricant pump 22. Spring-loaded member 38 retracts toward control 34 closing compressor inlet valve 33 and rotating lever 77 in clockwise fashion. Thus, valve stem 73 is operated to move disc 74 toward end 69 of chamber 67. The number of outlet ports 71, in communication via chamber 67 with lubricant inlet port 68, is reduced. Thus, in this mode of operation, the flow of recirculated lubricant into compressor 13 is reduced to an amount appropriate to the minimum requirements of idling compressor 13. More importantly, the reduced amount of lubricant in compressor 13 reduces the compressor loading on engine 11.

Thus, when compressed air is demanded, the present invention provides a simple, novel and effective means of reducing the compressor loading on engine 11 to a relatively bare minimum. The rapidity of engine 11 response to external air demands, during this critical acceleration period, is accordingly maximized.

Although the present invention has been described above with particular reference to a single preferred embodiment, the scope of the invention is not thereby limited. For example, the lubricant flow regulator means 63 and components related thereto are particularly described with reference to a turbocharged compressor system. These components may also be employed in other compressor systems, e.g. those employing simple combustion engines, to minimize engine wear and power requirements during acceleration. Further, the invention is described with the lubricant flow regulator means and related components integral to the air compressor system. However, the present invention also contemplates adaptability of those components for incorporation into existing air compressor systems.

I claim:
1. In an air compressor oil control system for a compressor normally driven by an engine between idle and compressing speeds, the compressor operable to supply air in response to external demands, the combination comprising
   lubricating means operable to supply lubricating oil to the compressor at varying rates, and
   a control valve associated with the engine and said lubricating means to regulate the rate of lubricating oil supply to the compressor as a function of compressor speed, said control valve being operable to regulate the lubricating oil supply from said lubricating means to the compressor at a minimum rate necessary for idling operation of the compressor in order to decrease loading of the engine during operation at idling speeds and acceleration to compressing speeds for increased rapidity of engine response to the external air demands.

2. In an air compressor system from which compressed air is intermittently withdrawn according to varying external air demands, the combination comprising:
   a prime mover operable at varying speeds in response to said varying external air demands and having a normal idling speed,
   a compressor coupled to be driven at varying speeds by said prime mover, said compressor being internally lubricated and having a compressed air outlet, said lubricant being carried from said compressor by said outlet compressed air;
   a compressor lubricant pump disposed to provide lubricant to said compressor;
   means disposed with relation to said pump for collecting lubricant from said outlet compressed air and transferring said collected lubricant to said compressor lubricant pump; and
   valve means associated with said compressor lubricant pump and said prime mover to selectively regulate the flow of lubricant internally provided to said compressor in response to said varying compressor speed, said valve means being responsive to operation of said prime mover at its idling speed to assume a relatively closed position for limiting lubricating oil supply to the compressor at a minimum rate necessary for idling operation of the compressor in order to decrease loading of the prime mover during operation at its idling speed and acceleration to compressing speeds for increased rapidity of engine response to the external air demands.

3. In an air compressor system according to claim 2 wherein:
   lubricant cooling means are disposed to receive lubricant from said compressor lubricant pump;
   said lubricant regulating valve is disposed between said cooling means and said compressor, said valve being operable into a relatively open position when the prime mover is driving the compressor at compressing speeds to permit the lubricating oil supply to meet needs of the compressor; and
   means are associated with said valve to operate said valve in response to varying compressor speed.

4. In an air compressor system according to claim 3 wherein:
   said prime mover is a turbocharged engine having an air inlet manifold wherein air pressure is generally proportional to the speed of said engine and said compressor; and
   said lubricant control valve operating means communicates with said engine inlet manifold, detecting air pressure variations therein and operating said lubricant control valve in response to said detected inlet manifold air pressure variations.

5. The air compressor system of claim 4 wherein said lubricant control valve comprises:
   a valve housing defining an interior elongated cylindrical chamber having first and second ends, a lubricant inlet port generally at a first end of said chamber and a series of outlet ports of selected size in generally uniformly spaced and generally linearly aligned relation along the length of said chamber, said inlet port in communication with said cooling means to deliver lubricant therefrom into said chamber, said outlet ports in communication with said compressor to deliver lubricant from said chamber to said compressor interior;
   an elongated valve stem hermetically and slideably penetrating said housing at said first chamber end parallel to said chamber length, a first end of said valve stem within said chamber having a disc joined normally thereto, said disc radially mating in sealing and slideable relation with said chamber housing, a second end of said valve stem without said chamber being joined to said valve operating means, said valve operating means moving said valve stem and said valve disc to maintain a varying number of said outlet ports in communication with said inlet port by means of said chamber.

6. In an air compressor system from which compressed air is to be intermittently withdrawn according to external air demands, the combination comprising:
   a turbocharged diesel engine operable at compressing and idling speeds according to said varying external air demands, said engine having an air inlet manifold wherein air pressure is generally proportional to the speed of said engine;
   a compressor coupled to be driven by said engine and having an air inlet and compressed air outlet, said compressor of a type requiring an internal supply of lubricant, said lubricant being entrained in said outlet compressed air, said compressor air inlet adapted to permit a varying amount of air thereinto in response to said engine speed variations;
   a compressor lubricant pump disposed to provide lubricant to said compressor;
   a receiver disposed to receive and store compressed air from said compressor outlet;
   means disposed in relation to said receiver for collecting entrained lubricant from compressed air therein;
   bypass means disposed with relation to said compressor outlet and adapted to provide for free circulation of compressed air from said compressor outlet to said compressor inlet while said engine is operating at idling speeds;
   means disposed with relation to said bypass means for collecting entrained lubricant from compressed air therein;
   lubricant return means disposed to selectively receive lubricant from said receiver and bypass collector means and deliver said lubricant to said compressor lubricant pump, said lubricant return means adapted to receive lubricant from said receiver collector means during operation of said engine at compressing speed and to receive lubricant from said bypass collector means during operation of said engine at idling speeds; and
   means disposed to receive lubricant from said lubricant return means and selectively control the flow of lubricant provided therefrom to said compressor.

References Cited
UNITED STATES PATENTS

| | | | |
|---|---|---|---|
| 1,844,954 | 2/1932 | Good | 230—5 |
| 2,211,875 | 8/1940 | Aikman | 230—3 |
| 2,961,146 | 11/1960 | Snow | 230—5 |
| 3,072,320 | 1/1963 | Cox et al. | 230—207 |

ROBERT M. WALKER, *Primary Examiner.*